United States Patent [19]
Lehmann

[11] 4,096,019
[45] Jun. 20, 1978

[54] TENSIONING- AND FRICTION WELDING APPARATUS

[75] Inventor: Peter Lehmann, Kirchdorf, Switzerland

[73] Assignee: Strapex AG, Wohlen, Switzerland

[21] Appl. No.: 774,255

[22] Filed: Mar. 4, 1977

[30] Foreign Application Priority Data

Mar. 8, 1976 Switzerland .................. 2839/76

[51] Int. Cl.$^2$ ............................................. B32B 31/00
[52] U.S. Cl. ................................. 156/494; 156/580
[58] Field of Search ..................... 156/494, 580, 735

[56] References Cited

U.S. PATENT DOCUMENTS

| 3,442,733 | 6/1969 | Vilcins | 156/580 |
| 3,442,734 | 6/1969 | Ericsson | 156/580 |
| 3,442,735 | 6/1969 | Stensaker | 156/580 |
| 3,648,739 | 3/1972 | Angarola | 140/93.2 |
| 3,654,033 | 4/1972 | Angarola | 156/494 |
| 3,984,278 | 10/1976 | Styner et al. | 156/522 |
| 4,001,064 | 1/1977 | Nix | 156/580 |

FOREIGN PATENT DOCUMENTS 2,193,693 2/1974 France ...................... 156/494

Primary Examiner—Douglas J. Drummond
Attorney, Agent, or Firm—Werner W. Kleeman

[57] ABSTRACT

A tensioning- and friction welding apparatus for strapping a band formed of thermoplastic material about an article or object, comprising a welding-clamping jaw driven for to-and-fro movement relative to a counter-clamping jaw by means of an inclined drive lever or the like. The jaws engage with the ends of the bands clamped therebetween and which are also engaged by a reverse movement-blocking device, tension such band ends and after reaching a predestined band tension weld the band ends to one another. The counter-clamping jaw is locked in a work position and can be released therefrom and displaced in the tensioning direction.

10 Claims, 8 Drawing Figures

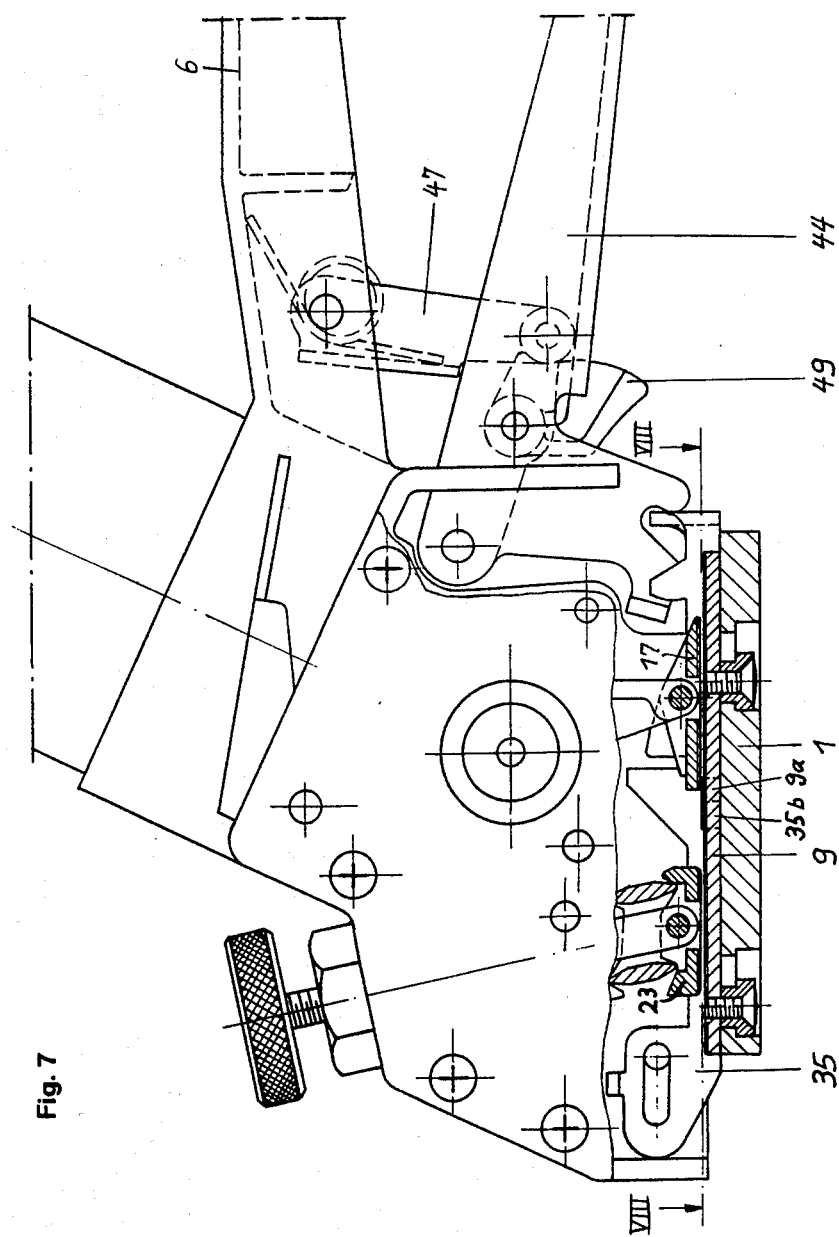

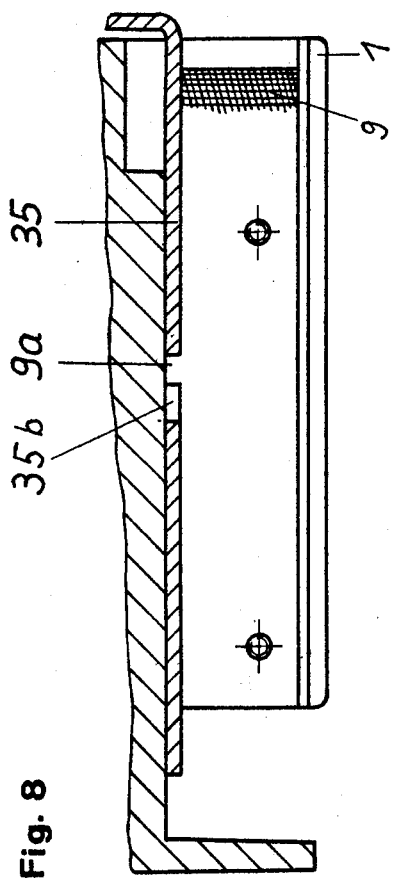

4,096,019

TENSIONING- AND FRICTION WELDING APPARATUS

BACKGROUND OF THE INVENTION

The present invention relates to a new and improved construction of a tensioning- and friction welding apparatus for a band formed of thermoplastic material which is wrapped about an article, typically boxes, crates, packages and the like, comprising a welding-clamping jaw driven to-and-fro relative to a counter-clamping jaw by means of an inclined drive lever or the like, wherein the jaws engage with the ends of the band clamped therebetween which are also engaged by a return movement-blocking device, tension such band ends and after reaching a predetermined band tension weld the band ends to one another.

An apparatus of this general construction has become known to the art from German patent publication No. 2,521,474. This prior art apparatus is manifested by its particular simplicity in that, especially for tensioning and welding of the band ends always the same very simply constructed drive moves a single clamping jaw in the same manner back and forth. This state-of-the-art apparatus possesses a pair of blocking-clamping jaws which, during band tensioning, prevent return movement of the band. Both during tensioning as well as especially also during welding teeth of the different clamping jaws engage into the plastic bands, in order to thereby produce the requisite entrainment forces or holding forces between the clamping jaws and the plastic bands bearing thereagainst. Hence, it can happen that considerable effort is needed, following completion of the welding operation, to remove the clamping jaws, which are wedged against the band ends, from the latter without, as such is the case with other heretofore known equipment, having to spreadably arrange the entire clamping jaw-support together with the clamping jaws.

SUMMARY OF THE INVENTION

Hence, it is the primary object of the present invention to provide a new and improved construction of tensioning- and friction welding apparatus which is not associated with the aforementioned drawbacks and limitations of the prior art proposals.

Another and more specific object of the present invention aims at the provision of a new and improved construction of tensioning- and friction welding apparatus, which under all circumstances allows for relatively effortless opening of the pair of clamping jaws and removal of the welded band ends out of the apparatus.

It is another noteworthy object of this invention to provide a tensioning- and friction welding apparatus which is relatively simple in construction and design, economical to manufacture, easy to use, provides for positive interconnection of the band ends strapped about an article with the requisite strapping tension, and enables simple and easy removal of the interconnected band ends from the apparatus.

Now in order to implement these and still further objects of the invention, which will become more readily apparent as the description proceeds, the tensioning- and friction welding apparatus of the present invention is manifested by the features that the counter-clamping jaw is locked in a work position and can be unlocked therefrom and shifted in the tensioning direction. Due to this displacement or shifting of the one clamping jaw in the lengthwise direction of the band ends, it is possible to simultaneously also shift the band ends and the welding-clamping jaw and the apparatus can be shifted opposite to the tensioning direction relative to the band ends, so that the wedged clamping jaws release and enable an effortless removal of the apparatus from the welded band ends.

The inventive apparatus preferably possesses a pair of blocking-clamping jaws for preventing the return movement of the band. Further, the clamping jaw which is displaceable in the lengthwise direction of the band ends is preferably constructed to possess such a length that it cooperates both with the counter-clamping jaw serving to tension and weld the band ends as well as also with a blocking-clamping jaw.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 7 is a view, similar to the showing of FIG. 1, of a variant embodiment of the invention; and FIG. 8 is a partial sectional view of the modified apparatus construction of FIG. 7, taken substantially along the line VIII—VIII thereof.

DETAILED DESCRIPTION OF THE PREFERRED EMBODIMENTS

Figure 1:
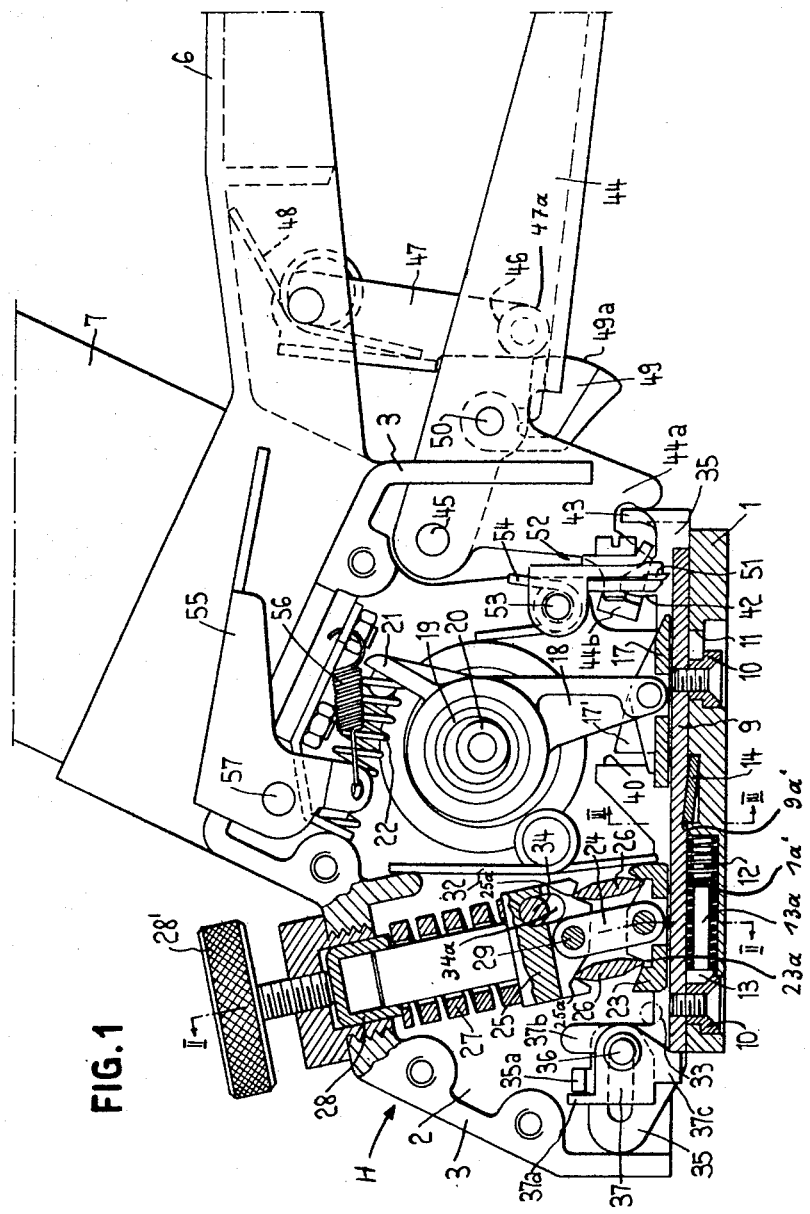
FIG. 1 is a side view of the apparatus, partially in section, with the housing cover removed to reveal internal structure.
Figure 2:
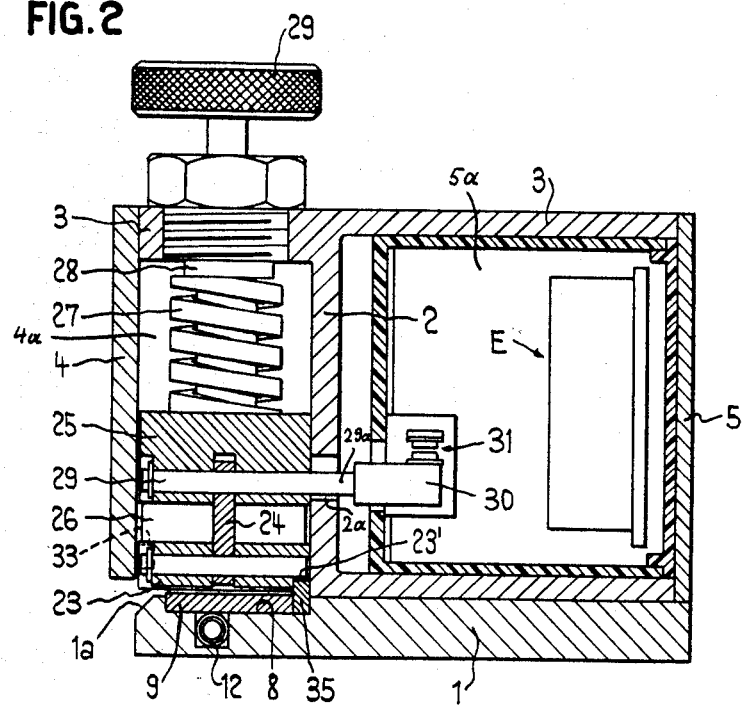
FIG. 2 is a cross-sectional view of the apparatus of FIG. 1, taken substantially along the line II—II thereof.

Describing now the drawings, the exemplary embodiment of apparatus depicted in FIG. 1 comprises a housing or a frame structure, generally indicated by reference character H, incorporating a base plate 1, an intermediate wall 2, and a housing casing 3. As best seen by referring to FIG. 2, the covers or cover members 4 and 5 which are conveniently threadably attached to the housing casing 3 enclose a respective compartment 4a and 5a. The compartment 4a houses the apparatus mechanism, whereas the other compartment 5a houses the electrical control circuit E, all as will be explained more fully hereinafter. The housing H is provided with a handgrip 6 above which there is mounted a suitable drive motor 7.

Figure 3:
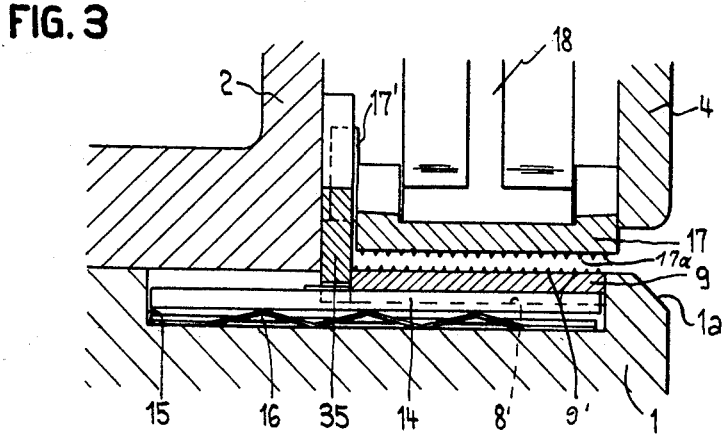
FIG. 3 is a partial sectional view, on an enlarged scale, taken substantially along the line III—III of FIG. 1.

Continuing, the base plate 1 is equipped with a substantially flat groove or channel 8 in which there is arranged for lengthwise displacement a substantially flat counter-clamping jaw 9. Guide sleeves 10 are threadably connected with the clamping jaw 9. These guide sleeves 10 are held to be lengthwise displaceable in elongate slots 11 which are widened at their lower end, as best seen by referring to FIG. 1. A pressure or compression spring 12 is arranged in a recess or bore 1a' of the base plate 1. This compression spring 12 acts upon the one guide element or guide sleeve 10 by means of the head 13 of a guide bolt 13a or equivalent structure extending through the coils of the pressure or compression spring 12. As a result, this last-mentioned guide element or sleeve 10 and the clamping jaw 9 interconnected therewith are retained in the illustrated left-hand end or terminal position. In this terminal position the clamping jaw 9 is locked by a slightly inclined, small locking plate 14 or the like which is located in a transversely extending groove 15 of the base plate 1 and held by means of a zig-zag or undulated spring 16 in the illustrated inclined locking position where it engages with a transversely situated notch 9a' of the clamping jaw 9, and thus, locks this clamping jaw 9 in the depicted left-hand terminal position. As best seen by referring to FIG. 3, the locking plate 14 protrudes laterally past the longitudinal or lengthwise extending groove 8 of the base plate 1 and past the clamping jaw 9.

Located above the end of the clamping jaw 9 which is situated at the right-hand portion of FIG. 1 is an upper welding-clamping jaw 17 which is appreciably shorter than the clamping jaw 9. The clamping jaw 17 is pivotably coupled with a drive lever 18 rotatably mounted on an eccentric 19 of a drive shaft 20. The drive lever 18 is equipped with a nose member or protuberance 21 against which acts a strong pressure or compression spring 22. This pressure spring 22 continuously exerts a rotational moment upon the drive lever 18 in the clockwise direction in such a manner that this drive lever 18 presses the clamping jaw 17 by a wedge action against the lower clamping jaw 9 and against two overlapping bands i.e. band ends inserted between these clamping jaws 9, 17. The overlapping band ends have been indicated by reference characters 100 and 101 in FIG. 5. The shaft 20 can be driven at a relatively high rotational speed by the drive motor 7 through the agency of a not particularly illustrated standard transmission or gearing.

Above the end of the lower clamping jaw 9 which is situated at the left-hand portion of FIG. 1 there is disposed a blocking-clamping jaw 23 which is considerably shorter than the clamping jaw 9. This blocking-clamping jaw 23 is movably connected by means of a bracket 24 with a counter support or abutment 25. The clamping jaw 23 and the counter support 25 are provided with knife-edge bearings 23a and 25a, respectively, at which engage two parallel support levers 26 serving to transmit the force or pressure between the clamping jaw 23 and the counter support 25. A strong compression or pressure spring 27 acts upon the counter support 25. The upper end of the pressure spring 27 bears against a sleeve 28 which can be axially adjusted by means of a knurled screw 28', in order to thereby regulate the pressure exerted by the spring 27 against the counter support 25. An upper pivot or hinge bolt 29 of the connection bracket 24 is extended through an opening 2a of the wall 2 and carries at its free end 29a an actuation roll 30 formed of insulating material for a switch 31, as best seen by referring to FIG. 2. A spring 32 or equivalent structure always is effective at the clamping jaw 23 towards the left of the showing of FIG. 1, to thereby eliminate the play between the clamping jaw 23 and the lower clamping jaw 9 and between the clamping jaw 23 and the support elements 26, respectively. Movement of the clamping jaw 23 towards the left of FIG. 1 is limited by a stop or impact member 33 which is attached at the housing cover 4. The counter support 25 is guided by means of a pin 34 engaging through an elongate hole or opening 34a of the counter support 25, this pin or shaft 34 being held at the intermediate wall 2 and at the cover 4. The pin 34 additionally determines the illustrated lower terminal or end position of the counter support 25.

Figure 4:
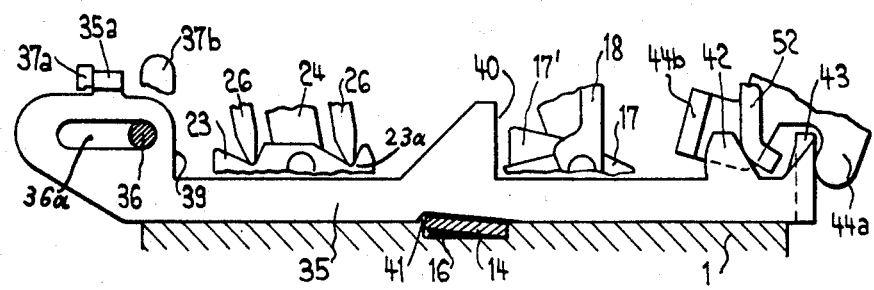
FIG. 4 is an enlarged view, partially in longitudinal section, of a portion of the apparatus of FIG. 1.

A control slide or slide member 35 is mounted to be lengthwise displaceable in the flat longitudinal groove 8 of the base plate 1. The end positions of the control slide 35 are determined by its contact with a bolt 36 arranged in an elongate slot 36a, as best seen by referring to FIG. 4. A laterally protruding, flexed tab or flap 35a engages between the entrainment members 37a and 37b of a band guide 37 mounted to be freely pivotable upon the bolt 36. The guide flaps or tabs 37c of the band guide 37 bear against the front end of the clamping jaw 9 (FIG. 1). The stop or impact surfaces 39 and 40 of the control slide 35 are located at the region of lateral projections 23' and 17' of the clamping jaws 23 and 17 respectively, and serve to shift such clamping jaws (FIG. 4). The rest position of the clamping jaws 23 and 17 at a slight spacing above the clamping jaw 9 is determined by contact of the lateral projections 23' and 17' with the control slide 35. At inclined surface 41 at the underside of the control slide 35 serves to shift or disengage the locking plate 14. The righthand end of the control slide 35, shown in FIG. 4, is coupled by means of a tooth or projection 42 and a transversely flexed flap 43 with the downwardly protruding arm 44a of an actuation lever 44 which is mounted at location 45. A locking lever 47 engages into the actuation lever 44 which possesses an upwardly open, substantially U-shaped profile or crossection. The locking lever 47 normally is retained in the illustrated rest position, under the action of a spring 48 or equivalent structure, and in which rest position its lower end 47a bears against a blocking lever 49 pivotably mounted at the lever 44. By upwardly rocking the blocking or locking lever 49 about its axis of rotation or pivot shaft 50, the locking lever 47 can be pivoted in the counter clockwise direction, and thus can be shifted out of its illustrated locking position in which it locks by means of a self-locking action the lever 44. The lever 47 is provided with a roller 46 at its lower end 47a, as best seen by referring to FIG. 1.

A cutter or knife 51 for cutting the upper band end 101 is located laterally of the driven clamping jaw 17, but still at the region of the lower clamping jaw 9. The cutter 51 is held to be exchangeable in a cutter support or carrier 52 which is pivotable about a shaft 53 and loaded by a spring 54 or the like which strives to rock the cutter support 52 and the cutter 51 in the clockwise direction, and thus, with the band ends 100 and 101 inserted, urges the cutter 51 to bear with a certain pressure against the upper band end 101. A lateral somewhat protruding flap or tab 44b of the lever arm 44a engages behind the tooth 42 and which upon rocking of the actuation lever 44 raises the cutter support 52 together with the cutter 51, against the action of the spring 54, from the lower clamping jaw 9 and the band ends 100, 101 respectively.

At the upper portion of the housing H there is mounted a switching lever 55 which is held in the illustrated rest position by the action of a restoring or return spring 56. Seated upon the shaft 57 of the switching lever 55 at the opposite side of the intermediate wall 2 is a switching dog or finger 57a, illustrated in FIG. 6, which actuates a switch 58 likewise schematically illustrated in FIG. 6 and which is similar to the switch 31.

Upon depression of the switching lever 55 or equivalent structure the switch 58 is closed.

Figure 6:
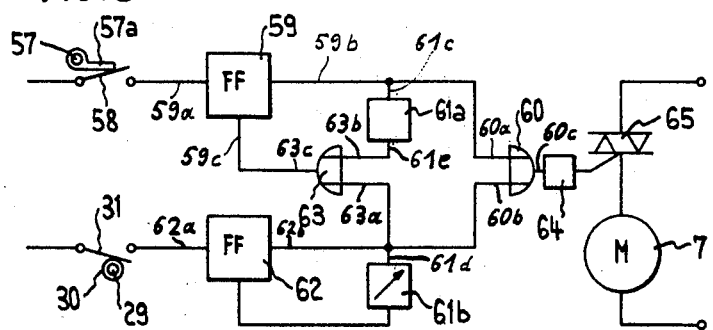
FIG. 6 is an electrical circuit diagram of the electrical portion of the apparatus portrayed in FIG. 1.

Turning attention now to the circuitry illustrated schematically in FIG. 6, it is to be understood that the switch 58 acts upon the input 59a of a flip-flop 59, the output 59b of which is connected with the one input 60a of an OR-gate 60 and with the input 61c of a timing element or timer 61a. The switch 31 acts upon the input 62a of a flip-flop 62, the output 62b of which is connected with the other input 60b of the OR-gate 60. The output 62b of the flip-flop 62 also is connected with the one input 63a of a further OR-gate 63 as well as with the input 61d of an adjustable timing element or timer 61b. The other input 63b of the OR-gate 63 is connected with the output 61e of the timing element 61a, whereas the output 63c of the OR-gate 63 is connected with the reset input 59c of the flip-flop 59. The output 60c of the OR-gate 60 acts through the intermediary of an amplifier 64 upon a triac 65 which switches-on and switches-off the drive motor 7.

Having now had the benefit of the foregoing description of the band strapping apparatus there will be now considered its mode of operation which is as follows:

FIG. 1 illustrates the apparatus in its rest condition, i.e. the band guide 37 is in its effectual position, the clamping jaws 17 and 23 are located at a slight spacing above the lower clamping jaw 9 and the cutter or knife 51 is disposed approximately perpendicular to and at a slight spacing above the lower clamping jaw 9. The counter support 25 is located in its lower impact or stop position. The shaft 29 is therefore likewise located in a lower terminal position and the switch 31 is open, as shown in FIG. 6. Also, the switch 58 is open and is then first closed when the switching or switch lever 55 is depressed. At this point in time the motor 7 is still switched-off.

In order to insert two overlapping ends 100, 101 of a plastic band, which is wrapped about an article, such as a package or the like, into the tensioning- and welding apparatus, the lever 49 is initially upwardly retracted or pulled, so that it rocks the lever 47 in the counterclockwise direction by means of its eccentric surface 49a and shifts such out of its toggle lever position. By exerting an upward pulling action at the actuation lever 44 the lever 47 can be rocked further in the counterclockwise direction against the action of the spring 48, so that the roller or roll 46 of the lever 47 travels towards the right within the actuation lever 44. The lever arm 44b thus engages the control slide 35 and pulls the same towards the right. As a result, the laterally bent or flexed tab or flap 35a of the control lever 35 engages with the tab or flap 35b of the band guide or guide means 37 and rocks the same in clockwise direction out of the operable zone of the lower clamping jaw 9. The actuation surfaces 39 and 40 of the control lever 35 engage with the clamping jaws 23 and 17, respectively, and displace the same towards the right, whereby the clamping jaw 23 is upwardly rocked about the pivot shaft 29 and the clamping jaw 17 about the drive shaft or axle 20 of the lever 18. The spring 22 is thereby somewhat compressed together. The tooth 42 of the control slide 35 engages with a portion of the cutter support 52, as such has been shown in FIG. 4, and upwardly rocks this cutter support 52 together with the cutter 51 about the shaft 53. The locking plate 14 has likewise been downwardly shifted during the displacement of the control slide 35, but this does not have any effect because the clamping jaw 9 is retained by the spring 12 in its front illustrated rest position. The space below the lower clamping jaw 9 is therefore now completely free and the overlapping band ends 100, 101 can be inserted from the side, i.e. from the left of FIG. 2 between the lower clamping jaw 9 and the upper clamping jaws 17 and 23 and the cutter or knife 51. A bevelled portion 1a of the base plate 1 facilitates such band insertion. The actuation lever 44 is now released and returns into the illustrated rest position. Consequently, the control slide 35 also returns back into its rest position and releases the cutter 51, the clamping jaws 17 and 23 and the band guide means 37. The cutter 51 now bears slightly inclined upon the upper band end 101, the clamping jaws 17 and 23 likewise bear upon such upper band end, and the band guide means 37 is pivoted into the illustrated rest position in front of both band ends 100, 101 and insures that during the subsequent tensioning- and welding or heat sealing operations these band ends 100, 101 will remain at the operable zone or region of the clamping jaws 9, 17 and 23 as well as at the region of the cutter or knife 51.

Figure 5:
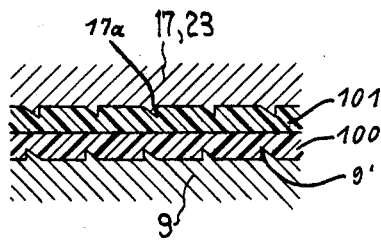
FIG. 5 is a partial sectional view on an extremely enlarged scale of part of the apparatus of FIG. 1.

When the apparatus has been prepared in the aforedescribed manner, then the switching lever 55 is depressed or otherwise appropriately actuated with the result that the switch 58 is closed. Hence, the flip-flop 59 switches and by means of the OR-gate 60, the amplifier 64 and the triac 65 switches-on the drive motor 7. As a result, the shaft 20 is placed into rotation and by means of the eccentric 19 and the lever 18 there is transmitted a to-and-fro movement to the clamping jaw 17. Since the lever 18 is disposed at a relatively steep inclination with respect to the lower fixed clamping jaw 9, this lever 18 exerts a considerable force or pressure, perpendicular to the lower clamping jaw 9, upon the clamping jaw 17 during its downward movement, whereas the pressure effective at the clamping jaw 17 is considerably less during the upward movement of the lever 18, but in any event does not drop to zero due to the continuous action of the spring 22, so that the clamping jaw 17 also cannot be lifted off. The drive shaft 20 is driven in the counter-clockwise direction. The clamping jaw 17 is thus placed into a to-and-fro movement, and during its forward stroke, i.e. during its movement towards the right of FIG. 1, it is pressed with considerable pressure against the upper band end 101, so that its forwardly inclined teeth 17a, as shown in FIG. 5 are pressed into the upper band end 101. At the same time, the lower band end 100 has imbedded therein the rearwardly inclined teeth 9' of the lower clamping jaw 9. The lower band end 100 is thus fixedly retained, whereas the upper band end 101 is displaced towards the right over the lower band end 100.

During the movement of the clamping jaw 17 towards the left of FIG. 1, at which time there is effective at such clamping jaw considerably lesser pressure perpendicular to the clamping jaw 9, the teeth 17a thereof depart out of the upper band end 101 and slide rearwardly over such band end 101. An entrainment of the upper band end 101 rearwardly, i.e., towards the left of FIG. 1, is prevented by the clamping jaw 23 as well as the cutter or knife 51. During each rearward movement of the clamping jaw 23 the same wedges under the action of the lever 26 between the upper band end 101 and the counter support 25 and thus blocks any return movement of the band.

During the next forward stroke of the driven clamping jaw 17 the upper band end 101 is again forwardly shifted through a predetermined distance, whereas during the rearward stroke of the clamping jaw 17 there occurs practically no reverse movement of the band. If somewhat later the band loop has been already stretched about the package then there is initiated the actual tensioning of the band and the tendency of the band, during the reverse or rearward stroke of the driven clamping jaw 17, to move rearwardly owing to the tension in the band increases. Due to the greater return movement force of the upper band end, which now must be absorbed by the blocking-clamping jaw 23, also this clamping jaw moves somewhat further back. Once there has been attained a certain band tension, then, the upper band end 101, during the reverse movement of the clamping jaw 17, travels back to such an extent that the cutter 51 penetrates sufficiently deep into the upper band 101 and severes the same in front of the clamping jaw 17. Consequently, there is now also eliminated the locking action of the cutter or knife 51 which retards return movement of the band so that the blocking-clamping jaw 23 must apply a greater blocking or locking force. Under the toggle lever action of the lever 26 the counter support 25 is thus now or soon thereafter raised against the force of the spring 27, so that the toggle lever action of the lever 26 increases more quickly than the force of the spring 27, with the result that the counter support 25 is raised until it impacts the pin 34. Consequently, by means of the elongated shaft 29 the switch 31 is closed. Thus, the flip-flop 62 switches and by means of the gate 60 and the amplifier 64 the triac 65 is still retained in its open state, so that the drive motor 7 continues to run. On the other hand, by means of the OR-gate 63 the flip-flop 59 is reset. The clamping jaw 17 is thus further driven, wherein, however, now the upper band end 101 is no longer displaced and tensioned, rather always forwardly shifted by the same amount and then again returned. The return movement is governed on the one hand, by the tension which is effective in the band, and, on the other hand, however, also by a certain drive force of the driven clamping jaw 17, the teeth 17a of which now continuously remain in engagement with the upper band end 101 and also can exert a certain entrainment force upon the band during the return movement of the clamping jaw 17. Hence, the band ends 100 and 101 are heated at the region of the clamping jaw 17 and finally fused and welded together or heat sealed. The welding duration can be adjusted by means of the adjustable timing element 61b, which is turned-on during the first switching of the flip-flop 62 upon the initial closing of the switch 31 and after expiration of the adjusted time delivers a reset pulse to the flip-flop 62. Thus, by means of the gate 60 and the amplifier 64 the triac 65 is blocked, and the motor 7 is turned-off.

Following a certain waiting time, during which the clamping jaw 17 still bears with a certain pressure against the upper band end 101 — this pressure being governed by the action of the spring 22 — and thus presses the band ends 100 and 101 against one another at the welding location until the same have sufficiently cooled and solidified, then the lever 44 is again raised in the described manner. Hence, initially the locking plate 14 is pressed downwardly and thus shifted out of the region of the lower clamping jaw 9. Thereafter, also the band guide means 37, the clamping jaws 17 and 23 and the cutter 51 are engaged by the control slide 35 and shifted towards the right. The lower clamping jaw 9 can also follow this shifting of the clamping jaws 17 and 23 towards the right, so that there is readily possible the displacement and lifting of the clamping jaws 17 and 23, which under circumstances can be rather intensely wedged at the upper band end 101. During this phase of the operation the band ends 100 and 101 are not moved towards the right relative to the apparatus, rather the apparatus is slightly shifted towards the left in relation to the band ends, and the clamping jaws 9, 17 and 23 initially remain adhering to the band ends 100 and 101 until the upper clamping jaws 17 and 23 are rocked upwardly and finally detached from the upper band end 101. These band ends 100 and 101 can now be laterally pulled out or the apparatus can be removed laterally from such band ends. Latest at this point in time the lower clamping jaw 9, under the action of the spring 12, returns into the illustrated rest position. As soon as the actuation lever 44 is released and returns back into the depicted rest position, the control slide 35 is also displaced towards the left and releases the different components. Also the locking plate 14 returns back into the illustrated locking position and locks the lower clamping jaw 9 in the depicted work position. Now there can be started a new work operation, and it is of course also possible to only actuate the actuation lever 44 once for the removal of the heat sealed or welded band ends 100 and 101 and for the insertion of band ends when there are to be tensioned and welded together directly in succession overlapping band ends.

If the apparatus is turned-on by mistake without there having been inserted therein the band ends to be interconnected, then the timing element or timer 61a again resets by means of the gate 63 the flip-flop 59 after a predestined time, amounting for instance to 8 seconds and thus, triggers cutting-off of the drive motor 7.

Different parts of the illustrated apparatus, shown herein by way of example, can of course be differently constructed. Thus, for instance, there can be employed another type of electronic circuit which allows appropriate control of the desired functions. There can be connected with the cutter support 52 a band guide similar to the band guide 37, which upon upward rocking of the cutter support 52 upon actuation of the lever 44, also can be upwardly rocked out of the operable zone or region of the clamping jaw 9 and facilitates the lateral introduction or removal, as the case may be, of the overlapping band ends. By means of the knurled screw or knob 28' it is possible to adjust the pressure of the spring 27, which in turn regulates the tension in the band. The stronger that the spring 27 is pressed against the counter support 25 the greater the tension necessary in the band until the counter support 25 can be raised against the pressure of the spring 27 and so that thereby there can occur the transition from the band tensioning operation to the band welding operation. If there are always only required the same and relatively low band tensions, then it would be conceivable under circumstances to omit the blocking-clamping jaw 23. The return movement of the band, during band tensioning, is then exclusively prevented by the cutter or knife 51, which upon reaching a certain tension finally severes the upper band end, whereupon this band end remains coupled with the driven clamping jaw 17 and for welding purposes is shifted back-and-forth upon the lower band end. Instead of using an electric motor, it is of course also possible to provide a different prime mover, such as a pneumatic motor.

Finally, with the variant embodiment shown in FIGS. 7 and 8, the clamping jaw 9 is connected by means of a dog or cam 9a in a drag connection with the control slide 35, this dog or cam 9a engaging into a recess 35b of such control slide 35. In the illustrated operating position of the apparatus the control slide 35, which is blocked by means of the locking lever 47 through the agency of the actuation lever 44, engages with the dog or cam 9a, so that the clamping jaw is urged into its left contact position, as shown in FIG. 7, and blocked in this position. If the locking or blocking lever 47 is rocked out of its effectual position by means of the blocking lever 49, and thus there is eliminated the blocking of the actuation lever 44 and the control slide 35 respectively, then this control slide 35 and also the clamping jaw 9 can move towards the right of FIG. 7. As a result, the control slide 35 or equivalent structure is readily capable of lifting the clamping jaw 17 and the blocking-clamping jaw 23 out of its clamping and blocking position, for the purpose of releasing the band ends which have been welded to one another.

While there are shown and described present preferred embodiments of the invention, it is to be distinctly understood that the invention is not limited thereto, but may be otherwise variously embodied and practiced within the scope of the following claims.

Accordingly, what I claim is:

1. A tensioning- and friction welding apparatus for a band formed of thermoplastic material and strapped about an article, comprising:
   a counter-clamping jaw;
   a displaceable-welding clamping jaw for both tensioning and welding the band;
   an inclined drive lever for driving the welding-clamping jaw to-and-fro relative to the counter-clamping jaw;
   return movement-blocking means for blocking return movement of the band;
   said counter-clamping jaw and said welding-clamping jaw cooperating to engage therebetween the ends of the band clamped between said jaws;
   said return movement-blocking means engaging with the ends of said band;
   said counter-clamping jaw and said welding-clamping jaw tensioning the band and after reaching a predetermined band tension welding said band ends to one another;
   means for locking the counter-clamping jaw in a work position; and
   means for unlocking said counter-clamping jaw from said work position and for enabling displacing the same in the direction of the tension applied to the band.

2. The apparatus as defined in claim 1, wherein:
   said return movement-blocking means comprises a blocking-clamping jaw;
   said counter-clamping jaw including a portion positional to cooperate with said blocking-clamping jaw of said return movement-blocking means.

3. The apparatus as defined in claim 2, wherein:
   said means for unlocking said counter-clamping jaw comprises a control slide for raising said welding-clamping jaw and said blocking-clamping jaw for the insertion and removal of the band ends and containing means for unlocking said counter-clamping jaw.

4. The apparatus as defined in claim 3, wherein:
   said control slide includes impact means for entraining the welding-clamping jaw and said blocking-clamping jaw in the direction of tensioning of the band; and
   said counter-clamping jaw being unlocked prior to entrainment of the welding-clamping jaw and the blocking-clamping jaw.

5. The apparatus as defined in claim 3, wherein said locking means for the counter-clamping jaw includes:
   spring means for holding said counter-clamping jaw in said work position; and
   a shiftable locking element for locking said counter-clamping jaw in said work position.

6. The apparatus as defined in claim 5, wherein:
   said unlocking means of said control slide is structured such that during displacement out of a rest position thereof said control slide shifts said locking element.

7. The apparatus as defined in claim 3, wherein:
   said control slide is shiftable substantially parallel to said counter-clamping jaw and can be locked in its rest position: and said counter-clamping jaw and said control slide including impact means which coact with one another in the rest position of said control slide.

8. The apparatus as defined in claim 7, including:
   an actuation lever operatively connected with the control slide;
   releasable blocking means cooperating with said actuation lever and effective in the rest position of the control slide.

9. The apparatus as defined in claim 8, wherein:
   said blocking means comprises a pivotable locking lever movable into an effective position;
   spring means operable upon said locking lever for orienting such when in its effective position, under the action of the spring force, essentially perpendicular to the actuation lever; and
   said blocking means including a blocking lever hingedly connected with the actuation lever for pivoting the locking lever out of said position essentially perpendicular to the actuation lever.

10. A tensioning- and friction welding apparatus for a band formed of thermoplastic material and strapped about an article, comprising:
    a counter-clamping jaw;
    a displaceable-welding clamping jaw for both tensioning and welding the band;
    drive means for driving the welding-clamping jaw to-and-fro relative to the counter-clamping jaw;
    return movement-blocking means for blocking return movement of the band;
    said counter-clamping jaw and said welding-clamping jaw cooperating to engage therebetween the ends of the band clamped between said jaws;
    said counter-clamping jaw and said welding-clamping jaw tensioning the band and after reaching a predetermined band tension welding said band ends to one another;
    means for locking the counter-clamping jaw in a work position; and
    means for unlocking said counter-clamping jaw from said work position and for enabling displacing the same in the direction of the tension applied to the band.

* * * * *